US012422252B2

(12) United States Patent
Martins

(10) Patent No.: US 12,422,252 B2
(45) Date of Patent: Sep. 23, 2025

(54) HOISTWAY SURVEY TOOL AND METHOD OF SURVEYING A HOISTWAY

(71) Applicant: OTIS ELEVATOR COMPANY, Farmington, CT (US)

(72) Inventor: Antonio Martins, Vernon, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 292 days.

(21) Appl. No.: 17/987,472

(22) Filed: Nov. 15, 2022

(65) Prior Publication Data

US 2024/0159519 A1    May 16, 2024

(51) Int. Cl.
*G01B 11/24* (2006.01)

(52) U.S. Cl.
CPC ................................... *G01B 11/24* (2013.01)

(58) Field of Classification Search
CPC ..... B66B 19/002; B66B 19/00; B66B 19/005; B66B 11/0206; B66B 5/22; B66B 5/18; B66B 7/024; G01B 11/24
See application file for complete search history.

(56) References Cited

U.S. PATENT DOCUMENTS

| | | | | |
|---|---|---|---|---|
| 5,020,641 A * | 6/1991 | Olsen | ..................... | B66B 19/002 187/408 |
| 5,931,264 A * | 8/1999 | Gillingham | ........... | B66B 7/1246 104/127 |
| 2007/0170013 A1 * | 7/2007 | Rivera | ..................... | B66B 7/024 187/408 |
| 2010/0018811 A1 * | 1/2010 | Vaudo | ..................... | B66B 19/00 187/409 |
| 2010/0309452 A1 * | 12/2010 | Qiu | ......................... | G01B 11/14 356/3 |
| 2014/0013562 A1 * | 1/2014 | Nakamura | .............. | B66B 11/06 29/402.01 |
| 2015/0217972 A1 * | 8/2015 | Hawkins | ................. | G01C 15/10 187/408 |
| 2018/0222720 A1 * | 8/2018 | Hamon | .................... | B66B 19/00 |
| 2021/0002103 A1 * | 1/2021 | Rocher | ...................... | B66B 7/06 |

(Continued)

FOREIGN PATENT DOCUMENTS

JP    2022002988 A    1/2022

OTHER PUBLICATIONS

European Search Report issued in European Application No. 23191611.5; dated Feb. 22, 2024; 7 pages.

*Primary Examiner* — Sang H Nguyen
(74) *Attorney, Agent, or Firm* — CANTOR COLBURN LLP

(57) ABSTRACT

A tool for surveying a multi-level elevator hoistway in preparation for installing hoistway rails, the tool having: a platform supporting a spatial range sensor that has an electronic controller, the controller receives instructions over a wireless network to measure a first distance between the platform and a first proximate wall, and stores transmits first data representing the first distance; the platform extends from a first side to a second side that are opposite each other, the first side has a first bracket that engages a first guide wire and the second end has a second bracket that engages a second guide wire; and the platform defines a first surface and a second surface, and first coupling link is connected to the first surface for connecting with a rope to raise or lower the platform against the first and second guide wires.

7 Claims, 12 Drawing Sheets

(56) References Cited

U.S. PATENT DOCUMENTS

| | | | |
|---|---|---|---|
| 2021/0403278 A1* | 12/2021 | Billard | H01F 7/0221 |
| 2022/0098006 A1* | 3/2022 | Mustafa | B66B 11/0206 |
| 2022/0162040 A1 | 5/2022 | Zimmerli et al. | |

* cited by examiner

HOISTWAY SURVEY TOOL AND METHOD OF SURVEYING A HOISTWAY

BACKGROUND

The embodiments herein relate to an elevator system and more particularly to a hoistway survey tool and method of surveying a hoistway.

Hoistway surveying prior to rail installation may be performed by a technician with a folding ruler. The technician is typically required to lean into the open hoistway to obtain the measurements, which could be dangerous and results in imprecise measurements.

BRIEF SUMMARY

Disclosed is a tool for surveying a multi-level elevator hoistway in preparation for installing hoistway rails, the tool including: a platform that supports a spatial range sensor that includes an electronic controller, wherein the controller is configured to receive instructions over a wireless network to measure a first distance between the platform and a first proximate wall and store on non-transient memory or transmit first data representing the first distance; the platform extends from a first side to a second side that are opposite each other, the first side of the platform includes a first bracket configured to engage a first guide wire and the second end of the platform includes a second bracket configured to engage a second guide wire; and the platform defines a first surface and a second surface, and first coupling link is connected to the first surface for connecting with a rope to raise or lower the platform against the first and second guide wires.

In addition to one or more aspects of the tool, or as an alternate, the sensor is laser sensor.

In addition to one or more aspects of the tool, or as an alternate, the sensor is pivotally connected to the platform.

In addition to one or more aspects of the tool, or as an alternate, the sensor is spaced apart from the first coupling link, and the tool includes a counterbalance for countering rotation induced by the sensor relative to an axis of the rope.

In addition to one or more aspects of the tool, or as an alternate, the first and second brackets are configured the same as each other; and the first bracket defines first and second L-bracket segments, wherein the first L-bracket segment extends perpendicularly away from the first surface of the platform and the second L-bracket segment extends perpendicularly away from the second surface of the platform.

In addition to one or more aspects of the tool, or as an alternate, the first and second L-bracket segment each include outer segments that extend away from the platform and are parallel with each other; and the outer segments each define a slot for receiving the first guide wire, each slot defining an inner portion that extends toward the platform.

In addition to one or more aspects of the tool, or as an alternate, each slot defines an outer slot portion that converges toward the inner portion, wherein the slot outer portion of the first L-bracket segment extends in first direction and the slot outer portion of the second L-bracket segment extends in a section direction that is opposite of the first direction.

In addition to one or more aspects of the tool, or as an alternate, the second surface of the platform includes a second coupling link for connecting with the rope.

Further disclosed is a method of surveying a multi-level elevator hoistway in preparation for installing hoistway rails, wherein the hoistway defines a ceiling and a pit, first and second sidewalls that are opposite each other, and front and back walls, the front wall defining an entryway at each level, the method including: coupling, at a first level within the hoistway, a platform of a surveying tool to a first set of guide wires that are adjacent to the first sidewall and extend between the ceiling and the pit, such that the platform is slidable against the first set of guide wires, wherein the platform supports a spatial range sensor that includes an electronic controller, the sensor being oriented to measure a first distance to a first proximate wall, the first proximate wall being one of the front wall and the first sidewall, lowering the platform, level by level, toward a second level within the hoistway and, at each level between the first and second levels, instructing the sensor, over a wireless network, to measure the first distance and store on non-transient memory or transmit first data representing the first distance, and determining, from the first data, a first clearance at each level between a first rail of the hoistway rails and the first proximate wall.

In addition to one or more aspects of the method, or as an alternate, wherein the sensor is laser sensor.

In addition to one or more aspects of the method, or as an alternate, the method includes coupling a rope to a first surface of the platform and the ceiling, the first level is an upper level nearest the ceiling and the second level is a lower level nearest the pit; and lowering the platform includes releasing the rope.

In addition to one or more aspects of the method, or as an alternate, the rope is coupled to the ceiling via a pulley located at a first rail installation position.

In addition to one or more aspects of the method, or as an alternate, upon the platform reaching the second level, the method includes: pivoting the sensor on the platform so that the sensor is oriented to measure a second distance to a second proximate wall, the second proximate wall being another of the front wall and the first sidewall; raising the platform, level by level from the second level to the first level and, at each level, instructing the controller, over the wireless network, to measure the second distance from the platform to the second proximate wall and store on non-transient memory or transmit second data representing the second distance; and determining, from the second data, a second clearance at each level between the first rail of the hoistway rails and the second proximate wall.

In addition to one or more aspects of the method, or as an alternate, the first surface of the platform includes a first coupling link for connecting with the rope; the sensor is offset from the first coupling link; and the tool includes a counterbalance for countering rotation induced by the sensor relative to an axis of the rope.

In addition to one or more aspects of the method, or as an alternate, the platform extends from a first side to a second side that are opposite each other, the first side of the platform includes a first bracket and the second side of the platform includes a second bracket; and coupling the platform to the first set of guide wires includes coupling the first bracket to a first guide wire and coupling the second bracket to a second guide wire.

In addition to one or more aspects of the method, or as an alternate, the second surface of the platform includes a second coupling link for connecting with the rope.

In addition to one or more aspects of the method, or as an alternate, upon the platform reaching the first level, the method includes: recounting the platform to the first set of wires so that the platform is inverted, the first bracket is coupled to the second wire, and the second bracket is coupled to the first wire; orienting the sensor to measure a third distance to a third proximate wall, the first proximate wall being one of the second sidewall; lowering the platform, level by level, toward the second level within the hoistway and, at each level between the first and second levels, instructing the sensor, over the wireless network, to measure the third distance and store on non-transient memory or transmit third data representing the third distance; and determining, from the third data, a third clearance at each level between the first rail of the hoistway rails and the third proximate wall.

In addition to one or more aspects of the method, or as an alternate, the first and second brackets are configured the same as each other; and the first bracket defines first and second L-bracket segments, wherein the first L-bracket segment extends perpendicularly away from the first surface of the platform and the second L-bracket segment extends perpendicularly away from the second surface of the platform.

In addition to one or more aspects of the method, or as an alternate, the first and second L-bracket segment each include outer segments that extend away from the platform and are parallel with each other; and the outer segments each define a slot for receiving the first guide wire, each slot defining an inner portion that extends toward the platform.

In addition to one or more aspects of the method, or as an alternate, each slot defines an outer slot portion that converges toward the inner portion, wherein the slot outer portion of the first L-bracket segment extends in first direction and the slot outer portion of the second L-bracket segment extends in a section direction that is opposite of the first direction.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
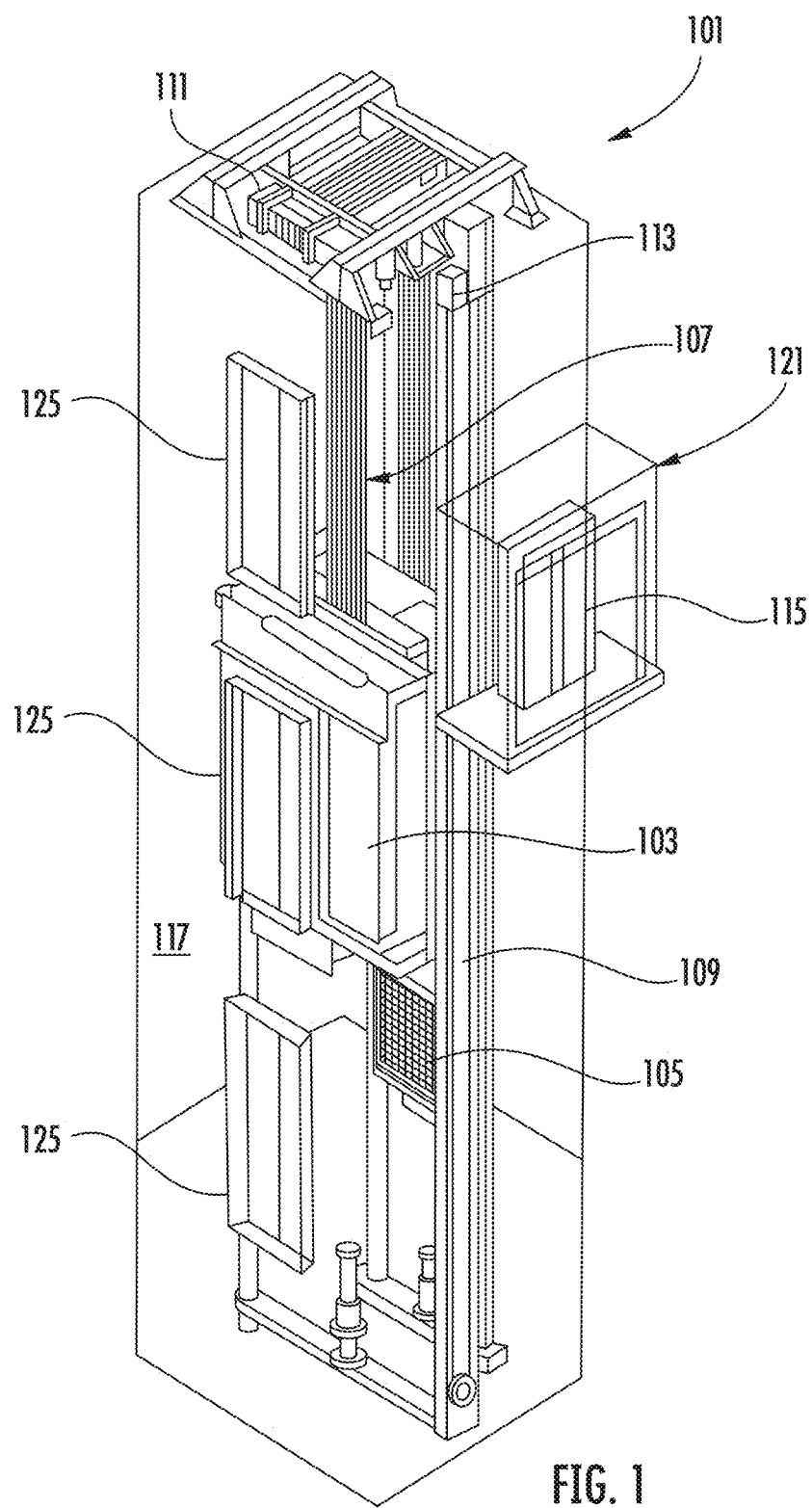
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
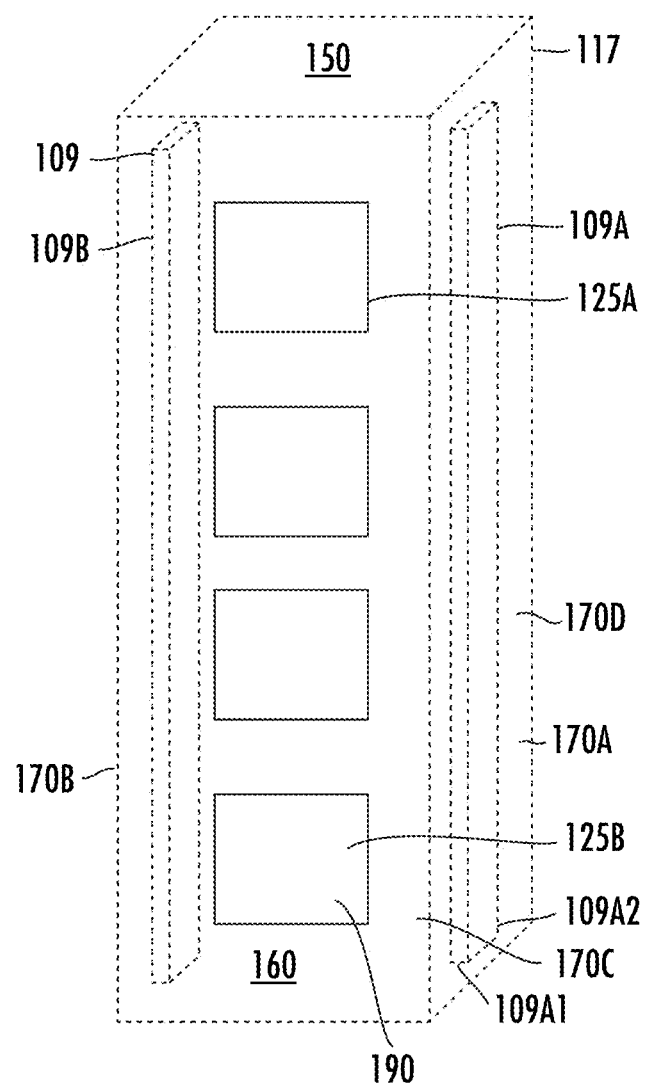
FIG. 2 shows rails within the hoistway.

Turning to FIG. 2, as indicated, a building may include the multi-level elevator hoistway 117 in which first and second hoistway rails 109A, 109B will be installed. The rails 109A, 109B may be the same as each other. The hoistway 117 may define a ceiling 150 and a pit 160, and walls 170, including first and second sidewalls 170A, 170B, that are opposite each other, and front 170C and back walls 170D. The rails 109A, 109B are configured in the hoistway 117 such that, e.g., a first end 109A1 of the first rail 109A is near the front wall 170C and a second end 109A2 of the first rail 109A is near the back wall 170D. The hoistway 117 may have a first level 125A that is an uppermost level, near the ceiling 150, and a second level 125B that is a lowermost level, near the pit 160. The front wall 170C may define an entryway 190 at each level.

Figure 3:
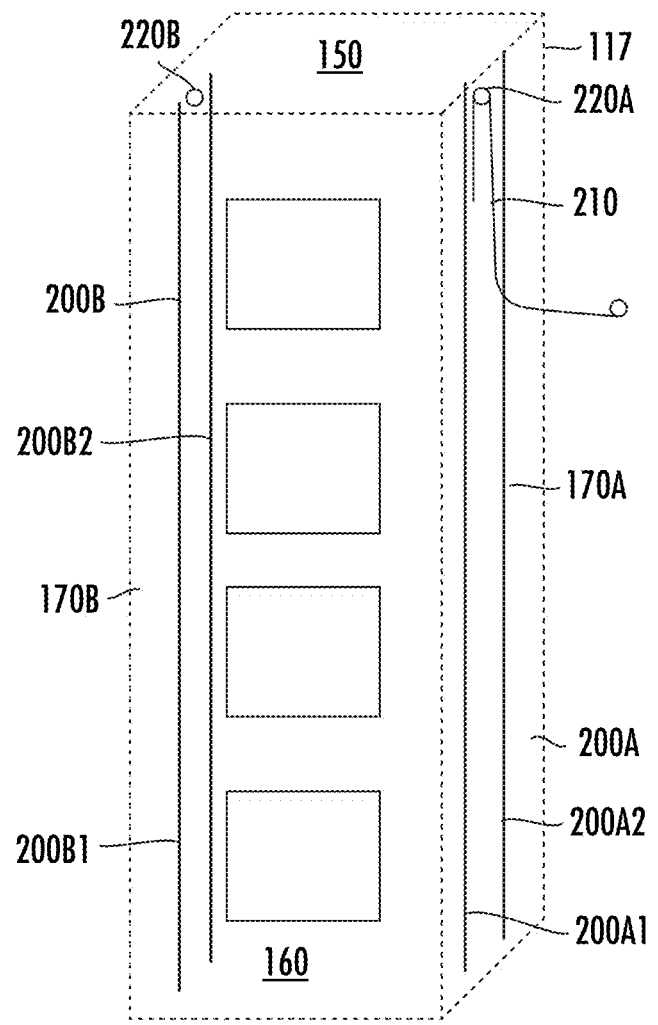
FIG. 3 shows guide wires within the hoistway prior to the installation of the rails.

Turning to FIG. 3, prior to installation of the rails 109A, 109B, the hoistway 117 may be surveyed to determine a clearance between the rails 109A, 109B and the walls 170. According to an embodiment, first and second sets of guide wires 200A, 200B are temporarily located adjacent to the sidewalls 170A, 170B and extend between the ceiling 150 and the pit 160. Specifically, the first set of guide wires 200A is located adjacent to the first sidewall 170A and the second set of guide wires 200B is located adjacent to the second sidewall 170B. The first set of guide wires 200A includes a first wire 200A1 that is near, or primate, the front wall 170C and a second wire 200A2 that is near the back wall 170D. The second set of guide wires 200B includes a first wire 200B1 that is near, or primate, the front wall 170C and a second wire 200B2 that is near the back wall 170D. The guide wires in each set may be spaced apart from each other by a distance corresponding to a width of the guide rails 109, e.g., in the front-to-back direction for the hoistway 117.

At the start of the survey, a rope 210 is hung from the ceiling 150 at a location corresponding to a center of the first rail 109A. A first pulley 220A may be connected to the ceiling 150 above the location of the center of the first rail 190A to enable letting-out or drawing-in the rope 210. A second pulley 220B may be connected to the ceiling 150 above the location of the center of the second rail 190B for the same purpose.

Figure 4:
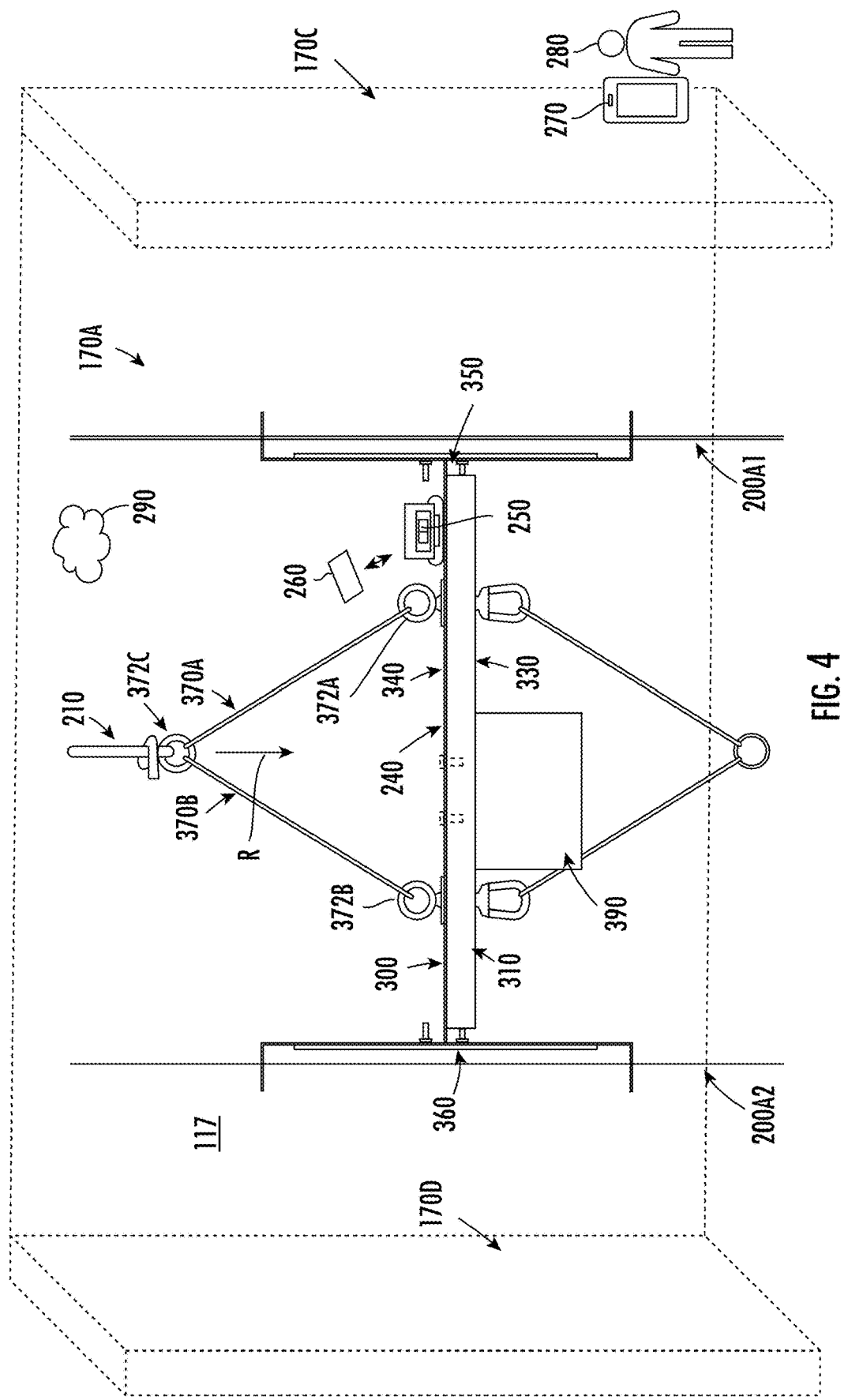
FIG. 4 shows a survey tool in the hoistway.
Figure 5:
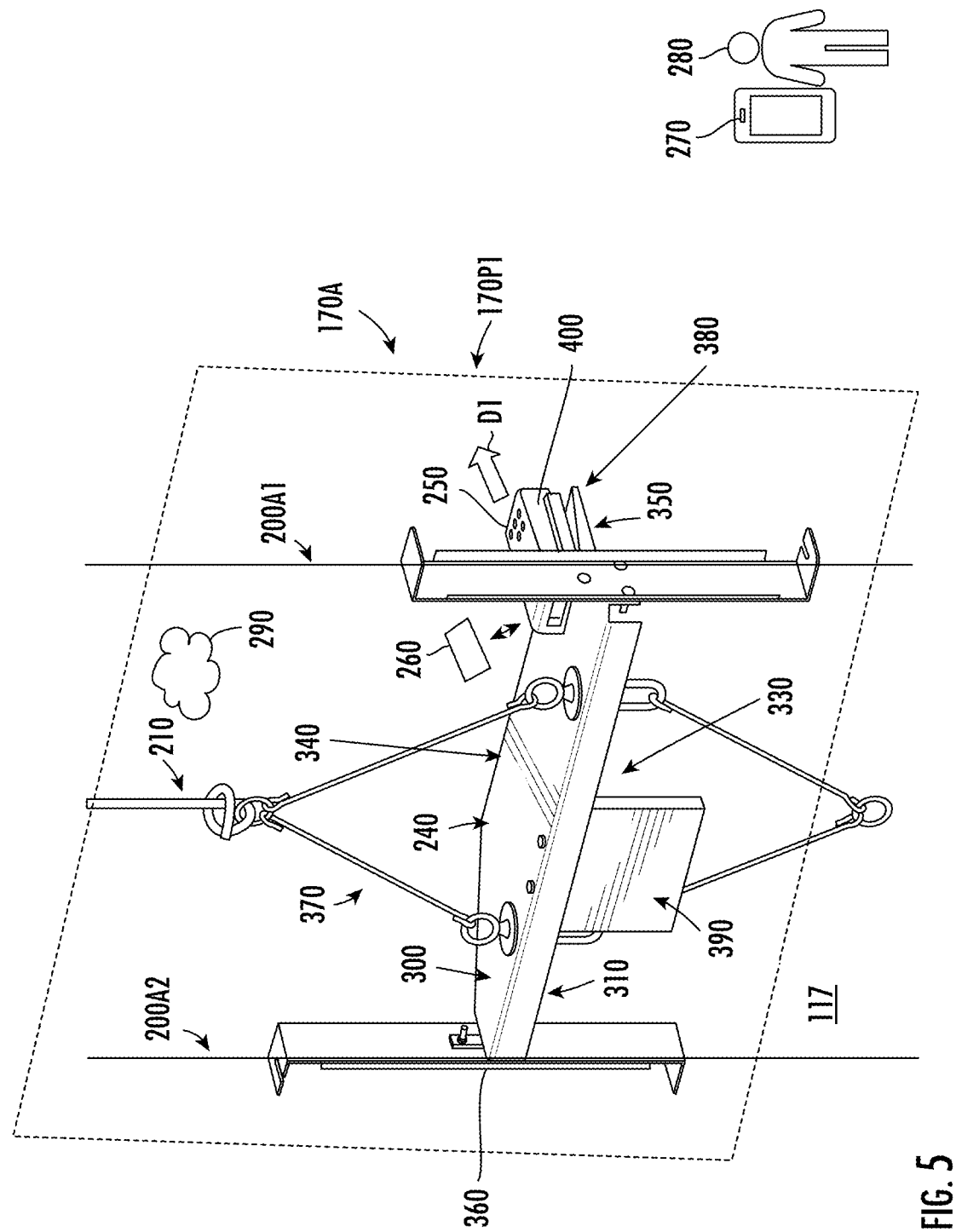
FIG. 5 is another view of the survey tool in the hoistway with a sensor facing a first sidewall.

As shown in FIGS. 4 and 5, a tool 230 or assembly is disclosed for surveying the hoistway 117. The tool 230 includes a platform 240 or sled that supports a spatial range sensor 250. The sensor 250 includes an electronic controller 260 configured to receive instructions from a mobile device 270 of a technician 280 over a wireless network 290 to measure a first distance D1 between the platform 240 and a first proximate wall 170P1 and store on non-transient memory, e.g., on the controller 260, or transmit to the mobile device 270 first data representing the first distance D1. The first proximate wall 170P1 may be the first sidewall 170A or the front wall 170C, depending on the orientation of the sensor 250 and platform 240. As shown in FIG. 5, the first proximate wall 170P1 is the first sidewall 170A. The sensor 250 may be a laser sensor. The wireless network 290 may be a Bluetooth network or other wireless network identified below.

The platform 240 includes a first surface 300 that is a top surface and a second surface 310 that is a bottom surface. The platform 240 extends from a first end 330 to a second end 340 that are opposite each other and define a front end and a back end. The platform 240 also extends from a first side 350 to a second side 360 that are opposite each other. A first coupling link 370 that is a top coupling link is connected to the first surface 300 for connecting with the rope 210.

The first coupling link 370 is located adjacent to the first end 330 so that a reaction force R from the rope 210 engaging the first coupling link 370, e.g., along the axis of the rope 210, is midway between the first and second sides 350, 360. The first coupling link 370 includes first and second legs 370A, 370B connected to the platform 240 at their bottom ends by first and second eyelet fasteners 372A, 372B or ring fasteners. The first eyelet fastener 372A is near the first side 350 of the platform 240 and the second eyelet fastener 372B is near the second side 360 of the platform 240. A third fastener 372C or coupling ring connects the first and second legs 370A, 370B at their top ends and the rope 210. This configuration provides a more stable connection between the rope 210 and the platform 240 than a single point of contact.

The platform 240 has a first corner 380 (FIG. 5) at the junction of the second end 340 and the first side 350, and the sensor 250 is located there. That is, the sensor 250 is offset from the first coupling link 370. The offset distance is for example a distance between a center of the first rail 109A and the first end 109A1 of the first rail 109A. With this configuration, the first distance D1 is indicative of clearance between the first end 109A1 of the first rail 109A and the first sidewall 170A of the hoistway 117.

The platform includes a counterbalance 390. The counterbalance 390 counters rotation inducing forces from the positioning of the sensor 250 relative to the axis of the rope 210.

Figure 6:
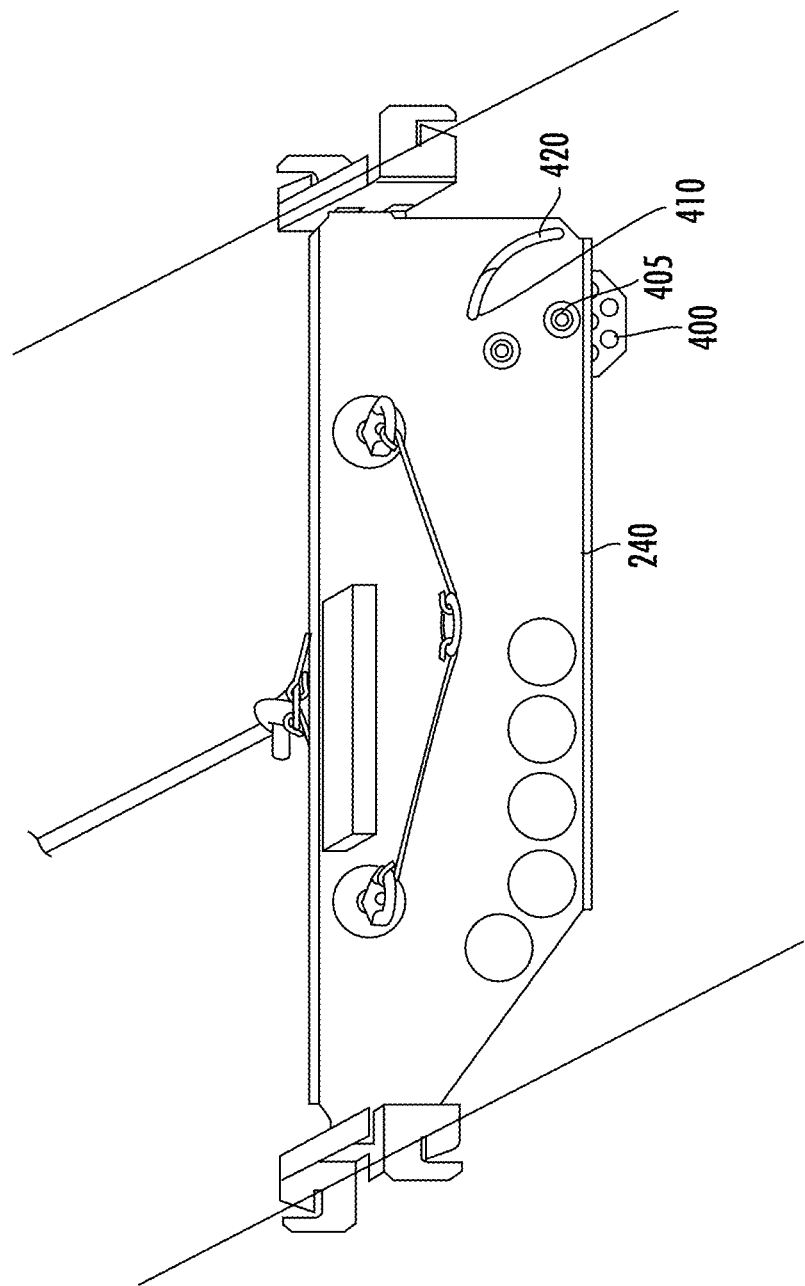
FIG. 6 shows a bottom surface of the tool.

The sensor 250 is attached to a sensor platform 400, which may be a sensor support bracket. As shown in FIG. 6, the sensor platform 400 is pivotally connected to the platform 240 a fastener 405 extending between the sensor platform and the platform 240. A guide pin 410 extends from the sensor platform 400 through an arcuate slot 420 in the platform 240. With this configuration, the sensor 250 is configured to pivot within a predetermined range, such as ninety degrees against the platform 240. One of the fastener 405 and the guide pin 410 may be configured for engaging the platform 240 and rotationally locking the sensor 250 against the platform 240. For example the fastener 405 or guide pin 410 may be threaded and secured with a wing nut (not shown). This may prevent the sensor 250 from unintended rotational movement during use.

Figure 7:
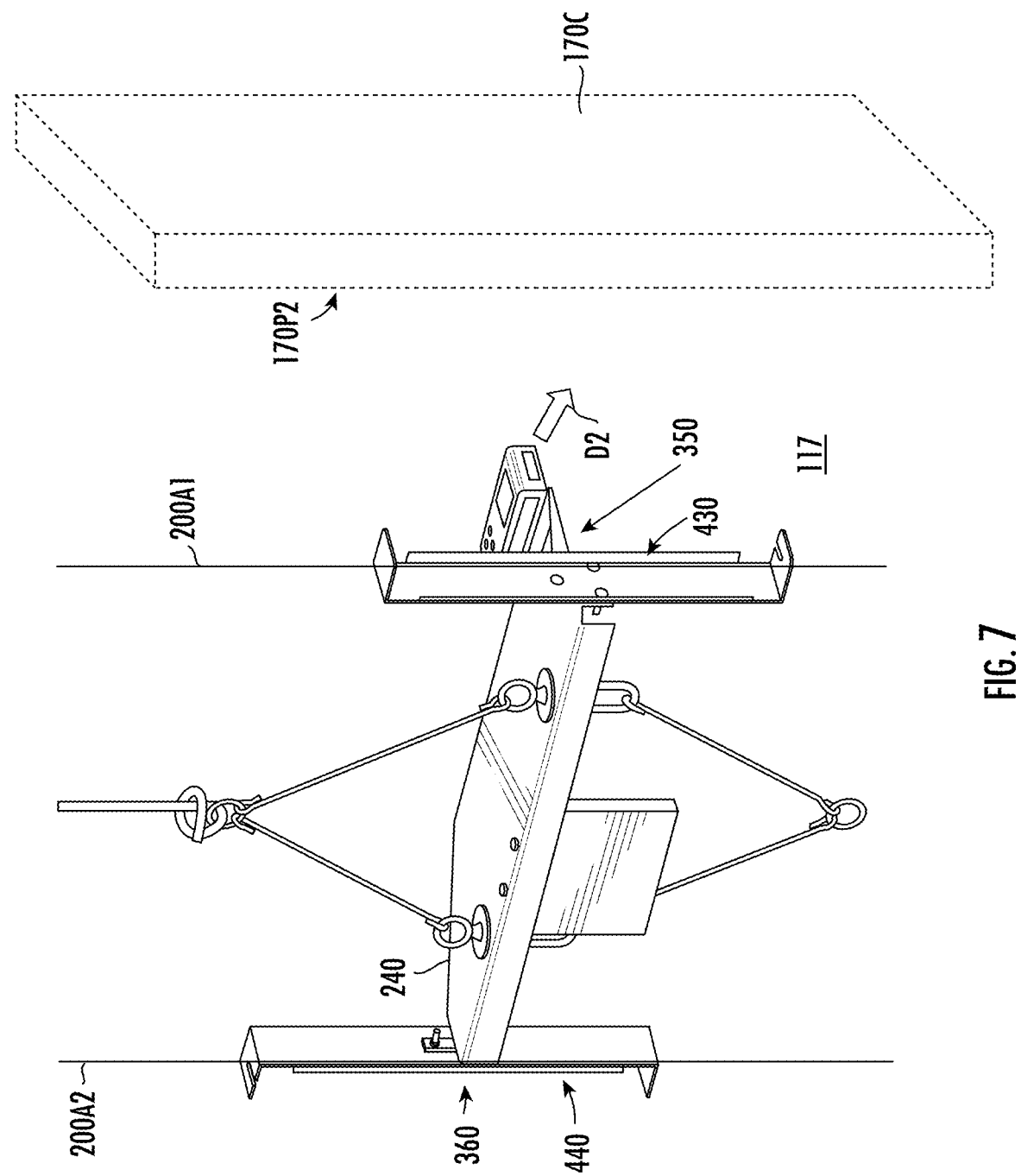
FIG. 7 is another view of the survey tool in the hoistway with the sensor facing a back wall.

As shown in FIG. 7, the pivoting enables the sensor 250 to measure a second distance D2 between the sensor 250 and a second proximate wall 170P2, which is the front wall 170C. The second distance D2 may be processed similarly to the first distance D1 when surveying the hoistway 117.

The first side 350 of the platform 240 includes a first bracket 430 configured to engage the first wire 200A1 and the second side 360 of the platform 240 includes a second bracket 440 configured to engage the second wire 200A2. The first and second brackets 430, 440 are essentially the same as each other.

Figure 8:
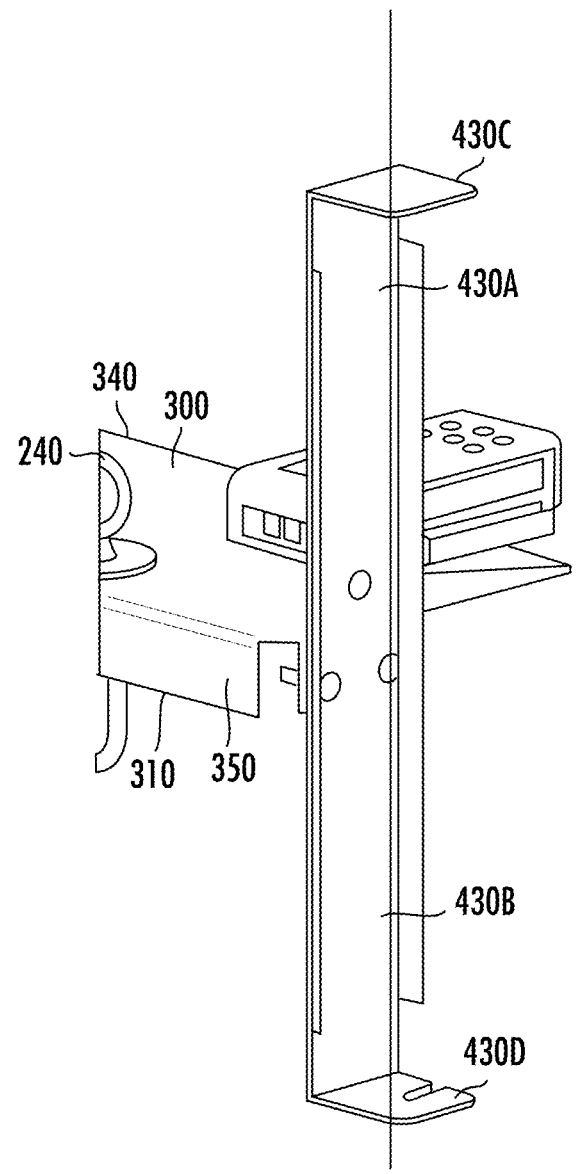
FIG. 8 shows a first bracket of the survey tool.

Turning to FIG. 8, the first bracket 430 has first and second L-bracket segments 430A, 430B, which are top and bottom L-bracket segments. The first L-bracket segment 430A extends perpendicularly away from the first surface 300 of the platform 240 and the second L-bracket segment 430B extends perpendicularly away from the second surface 310 of the platform 240. The first and second L-bracket segments 430A, 430B include first and second outer segments 430C, 430D that extend away from the platform 240 and are parallel with each other and the platform surfaces.

Figure 9:
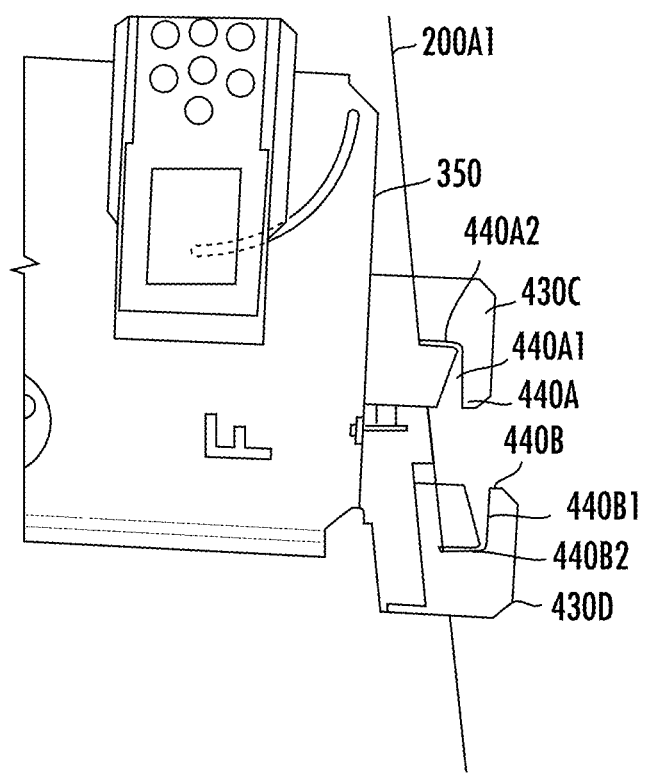
FIG. 9 is another view of the first bracket, showing wire receiving slots.

Turning to FIG. 9, the first outer segment 430C of the first L-bracket segment 430A defines a first slot 440A for receiving the first guide wire 200A1. The second outer segment 430D of the second L-bracket segment 430B defines a second slot 440B for receiving the first guide wire 200A1.

The first slot 440A defines a first slot outer portion 440A1 that opens toward the first end 330 of the platform 240 and the second slot 440B defines a second slot outer portion 440B1 that opens toward the second end 340 of the platform 240. That is, the first and second slot outer portions extend in opposite directions relative to each other.

The first slot outer portion 440A1 extends partially through the first outer segment 430C to a first slot inner portion 440A2 that extends toward the first side of the platform 240. The first slot inner portion 440A2 is configured to receive the first wire 200A with a clearance fit. The second slot outer portion 440B1 extends partially through the second outer segment 430D to a second slot inner portion 440B2 that extends toward the first side 350 of the platform 240. The second slot inner portion 440B2 is aligned with the first slot inner portion 440A2 and has a same size and shape as the first slot inner portion 440A2. In operation, tension in the wire 220A1 prevents it from slipping out of the slots. With this configuration in both the first and second brackets 430, 440, the platform 240 may be is slidable against the set of guide wires 200.

Figure 10:
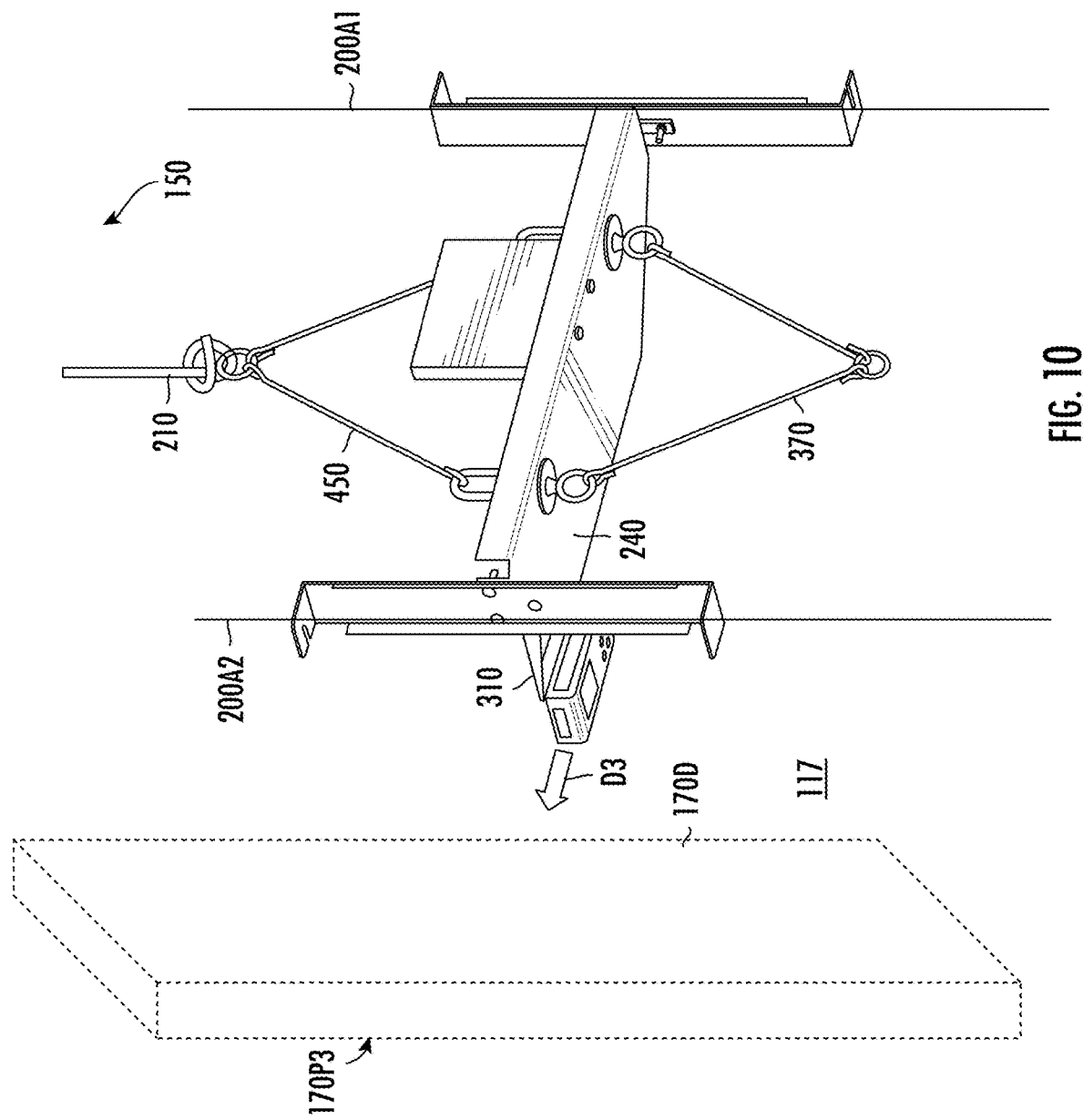
FIG. 10 is another view of the survey tool in the hoistway, where the tool is inverted, and the sensor faces a second sidewall.

Turning to FIG. 10, the second surface 310 of the platform 240 includes a second coupling link 450 for connecting with the rope 210. The first and second coupling links 370, 450 are configured the same as each other. With this configuration, the counterbalance 390 provides the same effect whether the rope 210 is connected to the first or second coupling link 370, 450. The platform 240 may be flipped around its center, i.e., inverted, so that the second surface 310 faces the hoistway ceiling 150. In the flipped configuration, the first bracket 430 engages the second wire 200A2, the second bracket 440 engages the first wire 200A1, and the rope 210 is connected to the second coupling link 450. A third distance D3 may be measured by the sensor 250 that is indicative of clearance between the second end 109A2 (FIG. 2) of the first rail 109 and a third proximate wall 170P3, for example, the back wall 170D of the hoistway 117.

Figure 11:
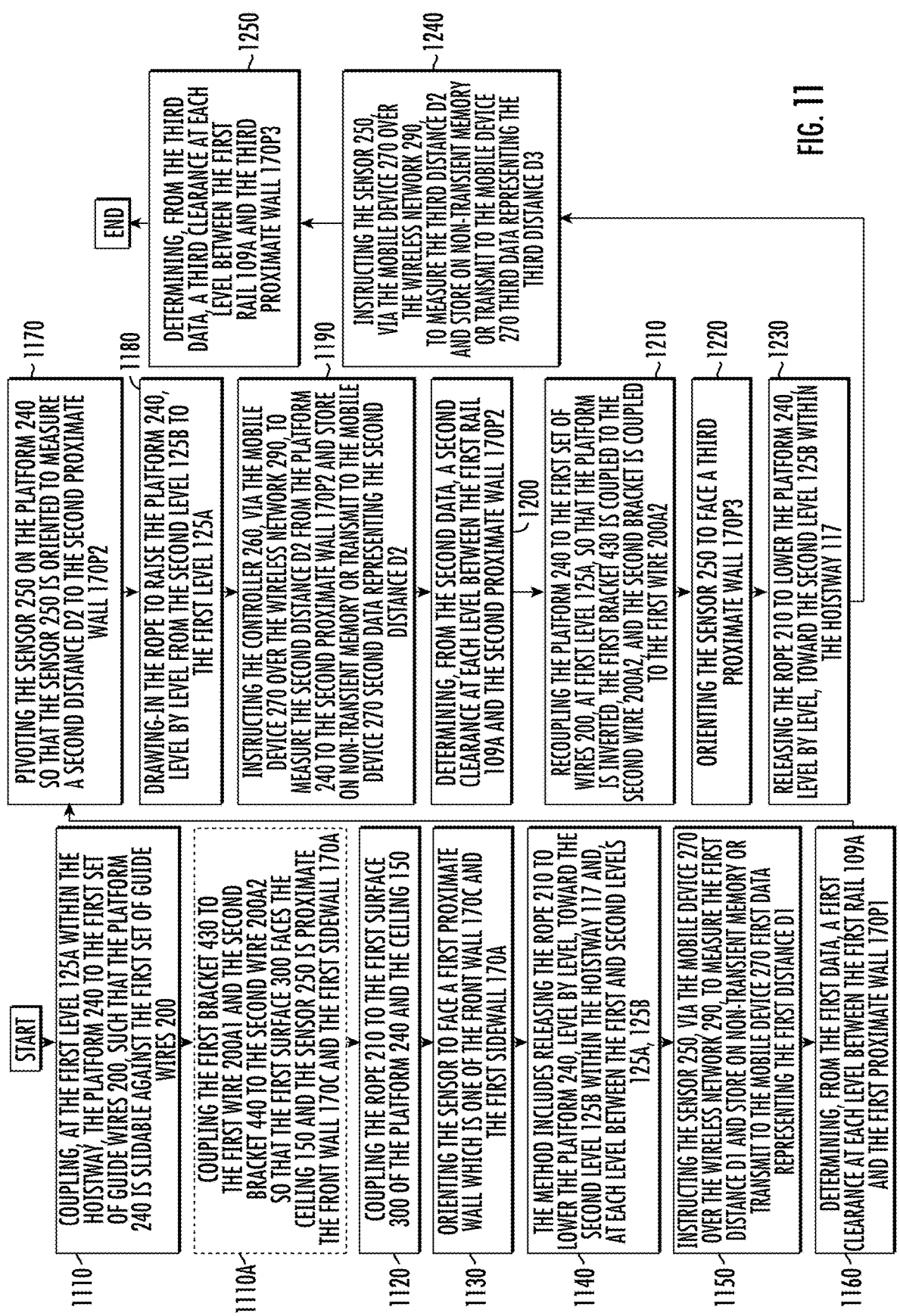
FIG. 11 is a flowchart showing a method of surveying a hoistway.

Turning to FIG. 11, a method is disclosed of surveying a multi-level elevator hoistway in preparation for installing hoistway rails using the tool 230. As shown in block 1110, the method includes coupling, at the first level 125A within the hoistway, the platform 240 to the first set of guide wires 200, such that the platform 240 is slidable against the first set of guide wires 200. As shown in block 1110A, block 1110 is further defined by coupling the first bracket 430 to the first wire 200A1 and the second bracket 440 to the second wire 200A2 so that the first surface 300 faces the ceiling 150 and the sensor 250 is proximate the front wall 170C and the first sidewall 170A.

As shown in block 1120, the method includes coupling the rope 210 to the first surface 300 of the platform 240 and the ceiling 150. As shown in block 1130, the method includes orienting the sensor to face a first proximate wall 170P1 which is one of the front wall 170C and the first sidewall 170A and, as discussed above, is the first sidewall 170A. As shown in block 1140, the method includes releasing the rope 210 to lower the platform 240, level by level, toward the second level 125B within the hoistway 117. At each level between the first and second levels 125A, 125B, the method includes block 1150 of instructing the sensor 250, via the mobile device 270 over the wireless network 290, to measure the first distance D1 and store on non-transient memory or transmit to the mobile device 270 first data representing the first distance D1. As shown in block 1160 the method includes determining, from the first data, a first clearance at each level between the first rail 109A and the first proximate wall 170P1.

As shown in block 1170, upon the platform 240 reaching the second level 125B, the method includes pivoting the sensor 250 on the platform 240 so that the sensor 250 is oriented to measure a second distance D2 to the second proximate wall 170P2, which is another one of the front wall 170C and the first sidewall 170A and, as discussed above, is the front wall 170C. As shown in block 1180, the method includes drawing-in the rope to raise the platform 240, level by level from the second level 125B to the first level 125A. As shown in block 1190, at each level, the method includes instructing the controller 260, via the mobile device 270 over the wireless network 290, to measure the second distance D2 from the platform 240 to the second proximate wall 170P2 and store on non-transient memory or transmit to the mobile device 270 second data representing the second distance D2. As shown in block 1200, the method includes determining, from the second data, a second clearance at each level between the first rail 109A and the second proximate wall 170P2.

As shown in block 1210, the method includes recoupling the platform 240 to the first set of wires 200, at the first level 125A, so that the platform is inverted, the first bracket 430 is coupled to the second wire 200A2, and the second bracket is coupled to the first wire 200A1. That is, the first surface 300 faces the pit 160 and the sensor 250 is proximate the back wall 170D and the first sidewall 170A. As shown in block 1220, the method includes orienting the sensor 250 to face a third proximate wall 170P3, which, as discussed above, is the back wall 170D. As shown in block 1230, the method includes releasing the rope 210 to lower the platform 240, level by level, toward the second level 125B within the hoistway 117. As shown in block 1240, at each level 125 between the first and second levels 125A, 125, the method includes instructing the sensor 250, via the mobile device 270 over the wireless network 290, to measure the third distance D3 and store on non-transient memory or transmit to the mobile device 270 third data representing the third distance D3. As shown in block 1250 the method includes determining, from the third data, a third clearance at each level between the first rail 109A and the third proximate wall 170P3.

The above method can be repeated by coupling the platform 240 to the second set of guide wires 200B to determine a clearance between the second rail 109B and the front wall 170C, the back wall 170D and the second sidewall 170B. Thus, a system and method are provided that enables surveying the hoistway 117 without requiring a mechanic to take measurements at each level 125 in the hoistway 117.

Figure 12:
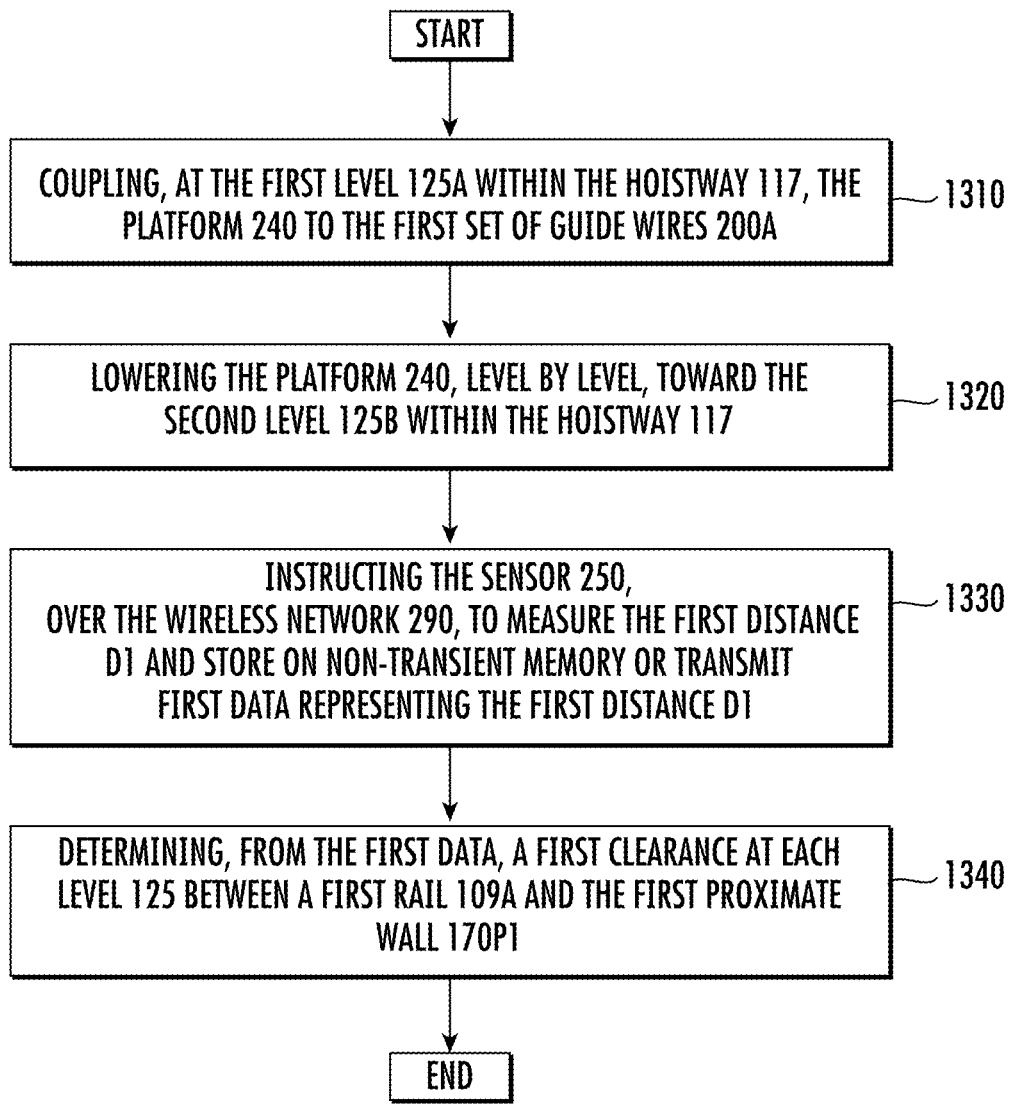
FIG. 12 is another flowchart showing more generally the method of surveying the hoistway.

Turning to FIG. 12, another flow chart shows a more general method of surveying the hoistway with the tool. As shown in block 1310, the method includes coupling, at the first level 125A within the hoistway 117, the platform 240 to the first set of guide wires 200A, such that the platform 240 is slidable against the first set of guide wires 200A. As shown in block 1320 the method includes lowering the platform 240, level by level, toward the second level 125B within the hoistway 117. As shown in block 1330, at each level between the first and second levels 125A, 125B, the method includes instructing the sensor 250, over the wireless network 290, to measure the first distance D1 and store on non-transient memory or transmit to first data representing the first distance D1. As shown in block 1340, the method includes determining, from the first data, a first clearance at each level 125 between a first rail 109A and the first proximate wall 170P1.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections (cables/interfaces) under the Modbus serial communications protocol, managed by the Modbus Organization. Modbus is a master/slave protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A tool for surveying a multi-level elevator hoistway in preparation for installing hoistway rails, the tool comprising:
a platform, defined by a unitary plate, that supports a spatial range sensor that includes an electronic controller,
wherein the controller is configured to receive instructions over a wireless network to measure a first distance between the platform and a first proximate wall of the hoistway and store on non-transient memory or transmit first data representing the first distance;
the platform extends from a first side to a second side that are opposite each other and configured for being coupled to a first set of guide wires including a first guide wire and a second guide wire, wherein the first side of the platform includes a first bracket configured to engage the first guide wire and the second side of the platform includes a second bracket configured to engage the second guide wire; and
the platform defines:
a first surface on one side of the unitary plate;
a second surface that is opposite the first surface on another side of the unitary plate, wherein the first surface is one of a top or bottom surface of the platform and the second surface is another of the top or bottom surface of the platform,
wherein:
a first coupling link connected to the first surface of the platform for connecting with a rope to raise or lower the platform against the first and second guide wires; and
a second coupling link connected to the second surface of the platform includes for connecting with the rope to raise or lower the platform against the first and second guide wires,
whereby the platform is configured for being either:
in a first orientation by coupling the first bracket to a first guide wire and coupling the second bracket to a second guide wire, and coupling the rope to the first coupling link; and
in a second orientation that is inverted by coupling the first bracket to the second wire and coupling the second bracket to the first wire, and coupling the rope to the second coupling link.

2. The tool of claim 1, wherein the sensor is laser sensor.

3. The tool of claim 2, wherein
the sensor is configured for being pivoted on the first surface of the platform so that the sensor is oriented to measure a second distance to a second proximate wall of the hoistway, wherein the first proximate wall is one of a front wall and a first sidewall and the second proximate wall is another of the front wall and the first sidewall.

4. The tool of claim 3, wherein
the sensor is spaced apart from the first coupling link, and the tool includes a counterbalance for countering rotation induced by the sensor relative to an axis of the rope.

5. The tool of claim 4, wherein:
the first and second brackets are configured the same as each other; and
the first bracket defines first and second L-bracket segments, wherein the first L-bracket segment extends perpendicularly away from the first surface of the platform and the second L-bracket segment extends perpendicularly away from the second surface of the platform.

6. The tool of claim 5, wherein:
the first and second L-bracket segments each include outer segments that extend away from the platform and are parallel with each other; and
the outer segments each define a slot for receiving the first guide wire, each slot defining an inner portion that extends toward the platform.

7. The tool of claim 6, wherein
each slot defines an outer slot portion that converges toward the inner portion, wherein the slot outer portion of the first L-bracket segment extends in first direction and the slot outer portion of the second L-bracket segment extends in a section direction that is opposite of the first direction.

\* \* \* \* \*